Feb. 2, 1971   R. W. CORNELL   3,560,110
RETENTION MEANS
Filed Jan. 3, 1969

INVENTOR
ROBERT W. CORNELL
BY Norman Friedland
ATTORNEY

United States Patent Office 3,560,110
Patented Feb. 2, 1971

3,560,110
RETENTION MEANS
Robert W. Cornell, West Hartford, Conn., assignor to United Aircraft Corporation, East Hartford, Conn., a corporation of Delaware
Filed Jan. 3, 1969, Ser. No. 788,857
Int. Cl. B64c 11/06
U.S. Cl. 416—214                               6 Claims

ABSTRACT OF THE DISCLOSURE

This relates to retention means for securing a propeller blade, having a cylindrical shank, to its hub and consisting of a split collar (two halves) and a ring cooperating therewith forming a rigid unitary-like connection. Cam surfaces on the inner and outer diameter of the collar, each having predetermined slopes, bear against a complementary slope formed on a boss formed on the root of the propeller blade and the other bears against a complementary slope formed on the ring so that the wedging action when assembled, forces the inner diameter of the collar to bear against both the slope on the boss and the cylindrical surface of the blade. The angles of the slopes are so selected as to prevent rocking or fretting action when in the assembled condition and to provide load paths to enhance the structural system.

BACKGROUND OF THE INVENTION

This invention relates to retention means and particularly to retention means for securing a propeller blade to the propeller hub and for accommodating thrust and angular bearings.

One heretofore known type of retention means requires upsetting the spar by compressing the end of the spar in a heated condition to form a flange thereon which serves to accommodate the thrust bearings. Obviously, this is a costly and an undesirable manufacturing procedure. Another disadvantage of this type of retention system is that the hub would, by necessity, have to be made in two halves in order to accommodate the larger diameter flange.

Another heretofore known type of retention system includes a wedgelike member such as a ring that engages a surface on a boss formed on the shank of the blade. For example, such a system would employ a heavy, hardened ring which would slide over the boss so as to hold in place a trapped ring formed from a plurality of segmented sections. However, this system was unsatisfactory because of the high retention loads, and structural action in the region of the trapped ring resulted in fretting and fatigue failures.

Accordingly, the purpose of this invention is to provide a retention system for securing the blades to the hub and accommodate a thrust-bearing without upsetting the spar and is characterized as having high structural capacity, is simple and inexpensive to make and can be easily assembled and disassembled. Additionally, the hub can be made in a single piece rather than the customary two-piece construction.

In accordance with the present invention a boss is formed at the end of the shank of the blade. A hardened ring wedge which is slid over the shank and a cooperating tightly-fitting split collar made in two halves is placed between the ring wedge and the boss on the shank. When the ring wedge is slid back over the split collar, it clamps all three parts together, the collar bearing against both the boss and shank. Under centrifugal load, the system clamps each member so as to mitigate any structural action and minimize fretting, and the entire load is transmitted from the blade through the collar, then the ring, then the bearing and eventually to the hub. The angle of the wedge is made such that there is no rocking action around the shank when the retention means is under load. The hoop stress in the ring is not excessive and the wedge system can easily be assembled and disassembled.

SUMMARY OF INVENTION

The primary object of the present invention is to provide an improved retention system.

A still further object of this invention is to provide a retention for a propeller blade comprising a split collar cooperating with a beveled surface of a boss formed at the root section of the blade and a cooperating ring having a complementary cam surface urging the collar to bear against the boss and shank of the blade. The unit provides a rigid connection and serves to form an inner race for the thrust bearings. Said retention means is characterized as being simple and inexpensive to manufacture and easy to assemble and disassemble.

Other features and advantages will be apparent from the specification and claims and from the accompanying drawings which illustrate an embodiment of the invention.

While the invention shown in its preferred embodiment illustrates the retention means for securing propeller blades to the hub of a propeller, it is to be understood, as is obvious to one skilled in the art, that such retention means may be employed for retaining other elements such as the piston and shaft of actuators and the like.

DESCRIPTION OF THE PREFERRED EMBODIMENT

Figure 1:
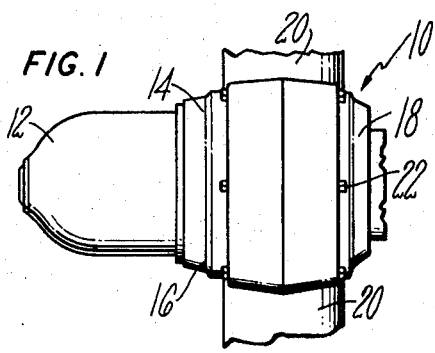
FIG. 1 is a side elevation view of the propeller assembly.

Referring specifically to FIG. 1, a customary aeronautical propeller is generally illustrated by numeral 10 as having a dome 12, a hub 14 formed in two symmetrical halves 16 and 18 for retaining a plurality of variable pitch blades 20 around the periphery thereof. The halves of the hub may be secured in position by a plurality of nut and bolt assemblies generally illustrated by numeral 22.

The details of the invention may best be seen by referring to FIGS. 2–6 (inclusive) wherein the propeller blade 20 fits in a cavity formed by the propeller hub 14. A boss 26 is machined on shank 28 of blade 20. As is typical in variable pitch propellers gear segment 30 splined to the inner diameter of the blade root meshes with bevel gear 32 rotatably mounted in the dome of the propeller and serves to rotate the blade about its longitudinal axis.

The retention means consisting of ring 32 and split collar 34 is sandwiched between the inner wall of hub 14 and shank 28. The bevel of surface 36 formed on the inner diameter of ring 32 bears against the bevel surface 38 formed on the outer diameter of split collar 38. Another bevel surface 40 is formed on the inner diameter of split collar 34 and bears against a complementary surface 42 formed on boss 26.

Thrust beatings which may take the form of roller bearings 44 are mounted between the outer diameter of rink 33 and the outer race 46 secured adjacent the shoulder 48 formed by hub 14. Obviously other bearing means, such as roller or angular bearings may equally be employed without departing from the scope of the invention.

When the propeller is rotated about its rotating axis, owing to the centrifugal load, the combined blade, split collar and ring clamp each member so as to mitigate any structural action and minimize fretting. As illustrated by the force diagram of FIG. 2, the angles of the slopes formed on boss 26, split collar 34 and ring 32 are so selected to cause the lines of action to meet approximately at a common point, which minimizes the structural action and results in high rigidity for the combined built up flange.

It is also noted that the diameter of boss 26 is selected to be slightly less than the diameter of cavity 24 so that it can be retracted therefrom. Hence, it is possible to retract the blade without separating both halves of the hub and obviously the hub can be made in a single piece, if so desired.

Figure 7:
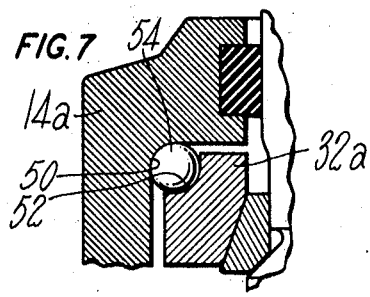
FIG. 7 is a fragmentary view in section illustrating another embodiment of this invention.
Figure 2:
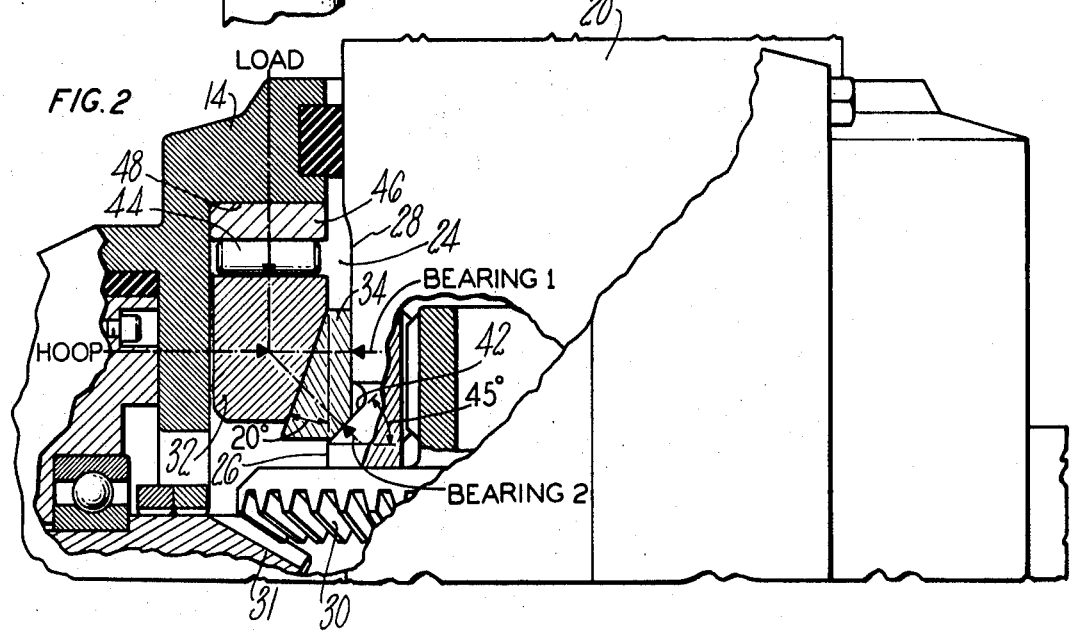
FIG. 2 is a fragmentary view partly in section and partly in elevation illustrating the details of the present invention.
Figure 3:
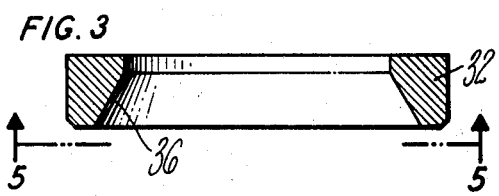
FIG. 3 is a sectional view illustrating the ring of the retention means.
Figure 4:
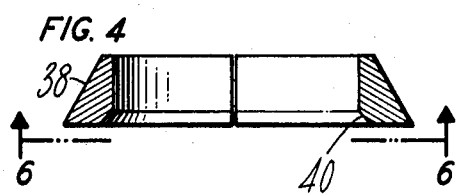
FIG. 4 is a sectional view illustrating the split collar.
Figure 5:
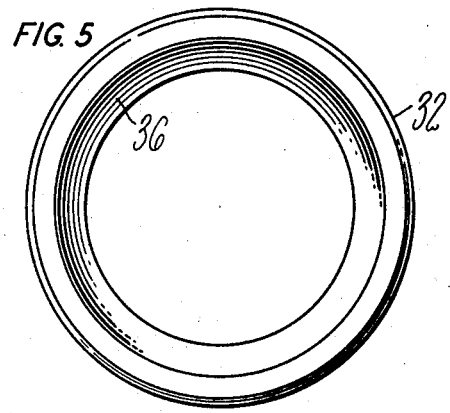
FIG. 5 is an end view taken along line 5—5 of FIG. 3.
Figure 6:
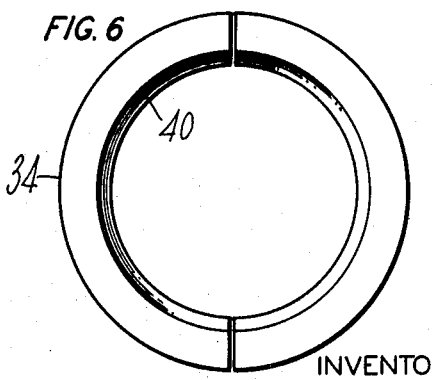
FIG. 6 is an end view taken along the line 6—6 of FIG. 4.

Another embodiment exemplified by this invention is shown in FIG. 7 which in all respects is identical to the structure shown in FIGS. 2–6 (inclusive) save for the type of bearing and a slight modification in the shape of the hub and ring. In this embodiment the inner wall of hub 14a and the outer wall of ring 32a are concaved to form bearing surfaces 50 and 52 to accommodate balls 54 (only one being shown) to form an angular bearing. It is noted that similar to the other embodiment the load is transmitted from the blade to the split collar, to the ring, to the ball and then to the housing, in that sequence.

It should be understood that the invention is not limited to the particular embodiments shown and described herein, but that various changes and modifications may be made without departing from the spirit or scope of this novel concept as defined by the following claims.

What is claimed is:

1. A retention system for securing a load producing element having a cylindrical portion to a structural support comprising a housing having a cavity portion for receiving the cylindrical portion of said element,
   a boss formed on said cylindrical portion of said element,
   a removable split collar formed from a pair of semicircular complementary halves having a beveled surface complementing and bearing against a beveled surface formed on said boss,
   a cylindrical surface on the inner diameter of said split collar complementing and bearing against said cylindrical portion of said load producing element,
   a removable ringlike element adapted to slide over said boss being disposed in said cavity portion adjacent the inner wall of said housing,
   said ringlike element having a beveled surface complementary to and engaging another beveled surface formed on the outer diameter of said split collar,
   a radially extending shoulder portion on said housing adjacent the end of said cavity defining a bearing surface,
   the load from said load producing element being transmitted through said split collar, then through said ringlike element and then to said bearing surface.

2. A retention system as claimed in claim 1 including thrust bearing means adjacent said bearing surface.

3. A retention system as claimed in claim 2 wherein said thrust bearing means includes roller bearings.

4. A retention system as claimed in claim 1 including ball bearings disposed between said bearing surface and said ringlike element.

5. A retention system for securing a load producing element having a cylindrical portion to a structural support comprising a housing having a cavity portion for receiving the cylindrical portion of said element,
   a boss formed on said cylindrical portion of said element,
   a removable split collar formed from a pair of semicircular complementary halves having a beveled surface complementing and bearing against a beveled surface formed on said boss,
   a cylindrical surface on the inner diameter of said split collar complementing and bearing against said cylindrical portion of said load producing element,
   a removable ringlike element adapted to slide over said boss being disposed in said cavity portion adjacent the inner wall of said housing,
   said ringlike element having a beveled surface complementing and bearing against another beveled surface formed on the outer diameter of said split collar,
   a radially extending shoulder portion on said housing adjacent the end of said cavity defining bearing means permitting relative movement between said hub and said load producing element,
   the angles of the beveled surface of said split collar and the beveled surface of said ringlike element being preselected so that the vectorial lines of action of the load transmitted by said load producing element approximate a common point in the ringlike element.

6. For an aeronautical propeller, a retention system for securing the propeller blade to a hub having a cavity portion,
   said blade having a cylindrical shank,
   a boss formed on said cylindrical shank,
   a removable split collar formed from a pair of complementary halves having a beveled surface complementing and bearing against a beveled surface formed on said boss,
   a cylindrical surface on the inner diameter of said split collar complementing and bearing against said cylindrical shank,
   a removable ringlike element adapted to slide over said boss being disposed in said cavity portion adjacent the inner wall of said hub,
   said ringlike element having a beveled surface complementary to and engaging another beveled surface formed on the outer diameter of said split collar,
   a radially extending shoulder portion on said hub adjacent the end of said cavity defining a bearing surface,
   the load from said blade being transmitted through said split collar, then through said ringlike element and then to said bearing surface.

References Cited

UNITED STATES PATENTS

| | | | |
|---|---|---|---|
| 1,573,000 | 2/1926 | Heath | 170—160.58 |
| 2,240,873 | 5/1941 | Thomas | 170—160.58(X) |
| 2,566,696 | 9/1951 | Cushman | 170—160.58(X) |
| 3,040,817 | 6/1962 | Elmes et al. | 170—160.58 |

FOREIGN PATENTS

| | | | |
|---|---|---|---|
| 218,966 | 5/1942 | Switzerland | 416—204 |

EVERETTE A. POWELL, Jr., Primary Examiner

U.S. Cl. X.R.

416—205